INVENTORS
KENNETH CHARLES ARTHUR BINGHAM
PATRICK JAMES PEOPLES
MICHAEL WILLIAMS

BY
Kirschstein, Kirschstein, & Ottinger
ATTORNEYS

INVENTORS:
KENNETH CHARLES ARTHUR BINGHAM
PATRICK JAMES PEOPLES
MICHAEL WILLIAMS
BY Kirschstein, Kirschstein & Ottinger
ATTORNEYS United States Patent Office 3,219,984
Patented Nov. 23, 1965

3,219,984

MEMORY DEVICES INCLUDING CROSSED CONDUCTORS IN THE PRESENCE OF FIELD MODIFYING ELEMENTS

Kenneth Charles Arthur Bingham, Chalfont St. Peter, Patrick James Peoples, London, and Michael Williams, Watford, England, assignors to The General Electric Company Limited, London, England Filed Jan. 23, 1961, Ser. No. 84,286
Claims priority, application Great Britain, Jan. 21, 1960, 2,314/60
4 Claims. (Cl. 340—174)

The invention relates to signal translating devices, that is to say, to devices designed for generating an electric output signal representative of information supplied to, or stored within, the device. Some examples of such devices are mechanical and audio transducers, computer data stores, and input devices for computers designed for reading information supplied to the computer on cards or tape.

According to the present invention, a signal translating device includes at least one circuit element comprising a drive conductor, a pick-up conductor crossing the drive conductor, input means through which an electric current can be supplied to the drive conductor, and support means for supporting an electrically conducting, non-ferromagnetic, electromagnetic field modifying element adjacent to the conductor crossing-point.

The conductors may cross at right-angles or obliquely. Preferably the crossed conductors are mutually insulated, and this will in general need to be so where, as will often be the case, the same conductor co-operates with several interconnected (e.g., earthed) second conductors in an arrangement including a plurality of circuit elements in accordance with the invention in combination.

The operation of a circuit element in a device according to the invention can best be explained by considering first the simplest form of it, in which the crossed conductors consist of two wires overlying one another at right-angles. When a current is passed through the drive conductor it produces an electromagnetic field encircling that conductor, but since the conductors are at right angles this field is everywhere symmetrical with respect to the pick-up conductor, and no voltage is induced in the pick-up conductor by the drive current. Now let it be supposed that an electrically conducting, non-ferromagnetic, electromagnetic field modifying element is placed in one sector of the cross formed by the two wires. In this case as the magnetic field is established eddy currents are induced in this conducting sector and delay the growth of the magnetic field in this region. This unbalances the magnetic lines of force about the pick-up conductor, so that the magnetic field about the pick-up conductor is no longer uniform but may be regarded as containing an unsymmetrical component linked with that conductor. The effect is that, as the magnetic field is established or decays, a current is induced in the pick-up conductor.

From the foregoing description it will be seen that in the presence of a modifying element the application of a signal to the drive conductor in the form of an approximately square wave produces a pulse during the rise time of the wave and a pulse of opposite polarity during the decay time of the wave. In use of devices incorporating this circuit element both pulses produced in the pick-up conductor will generally not be required, and only one, for example that generated during the rise time of the square wave, will be utilised as the output signal, the other being suppressed by the use of a diode or a gating circuit.

With the arms of the cross at right-angles as just described above no output signal is produced by a pulse in the drive conductor in the absence of a modifying element. In the presence of a modifying element in one of one pair of diagonally opposite sectors of the cross a pulse is produced on the rise or fall of drive current, and if the modifying element is transferred to one of the other pair of diagonally opposite sectors of the cross the polarities of these pulses are reversed. In some cases it may be desired to detect the presence or absence of a modifying element and to indicate its presence by a pulse of one polarity and its absence by a pulse of the other polarity. In this case the cross may be oblique, the modifying element being placed in the wider sector.

If the drive means is arranged to supply pulses of current, or an oscillatory current, the output signal will be a pulsed or oscillatory voltage related to the drive current in a way which depends on the position of the modifying element. In an alternative arrangement the drive means may supply a steady drive current, an output signal being induced in the pick-up conductor on moving a modifying element in such a way that it modifies the magnetic flux linking the conductors in the neighbourhood of this crossing.

From the foregoing it will be clear that the modifying element may take various different forms. Thus it may consist of either a coherent sheet of solid conducting material occupying one or both of a pair of opposite sectors, or of a conducting element carried by an insulating support, for example, printed on the support by use of a conducting ink.

The partciular form of the modifying element will, of course, depend on the purpose and nature of the device in which it is to be employed, and must be suitably chosen in each particular case.

To complete the drive conductor circuit the conductor which it is intended to use as the drive conductor may be accompanied by a return conductor, the drive and return conductors being arranged to be connected at one end to a transmission line, for example, to the inner and the outer conductors of a coaxial line, and the drive and return conductors at the other end being either connected together directly to form a short-circuited termination, or provided with a resistor of suitable value to match the impedance of the transmission line formed by the drive and return conductors. A similar arragnement may be adopted for the output means in respect of the conductor which it is intended to use as the pick-up conductor.

A signal translating device incorporating a number of circuit elements as described above and suitable, for example, for a data input device for a computer, may be constituted by a single drive conductor crossed by a number of pick-up conductors, together with means for supporting close to them, or moving past them, an information source containing information in the form of modifying elements. The information source may conveniently consist of a card or tape of insulating material and the information elements may be printed on it in metallic ink; in each case the modifying element must be of such a form as to act unequally in one pair of opposite sectors of the crossed conductors as compared with the other, and a long narrow conducting area having its length oblique to the arms of the crossed conductors, will provide suitable modifying elements.

In another arragnement a series of drive conductors may be arranged parallel to one another and be crossed by a series of parallel pick-up conductors, and means may be provided for mounting in juxtaposition to the various crossings modifying elements consisting, for example, of conducting areas on a plastic printed circuit board. A device of this kind may be used to provide a store for supplying instructions or numerical data for a computer, the necessary information being contained on the sheet and the appropriate line of information being read by supplying a pulse to the drive conductor for the required line, pulses being produced on the appropriate pick-up conductors to provide the information required for the computer. A device of this kind may be furnished with a number of interchangeable data sheets so that instructions may be set up semi-permanently and changed only at such intervals as required.

In a further arrangement the drive conductor may be in the form of a hairpin-shaped loop with closely spaced parallel sides, and may be connected between a pair of terminals forming the input means. A pick-up conductor crosses the loop and is insulated from at least one arm of it, and means is provided for supporting a modifying element within the loop and close to the pick-up conductor on at least one side of it. In the absence of the modifying element, the two sides of the loop are equally and oppositely coupled to the drive conductor, so that even if the pick-up conductor crosses the loop obliquely no output signal is produced.

In some cases the drive conductor may be fed with a constant direct current, an output signal then being produced in the pick-up conductor in response to movement of modifying elements. An arrangement of this kind may be used for sensing information represented by modifying elements formed on insulating card or tape and moved past the crossed conductors.

The invention will be further described with reference to the accompanying drawings in which.

Figure 3:
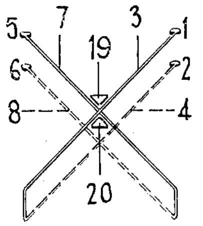
Figure 4:
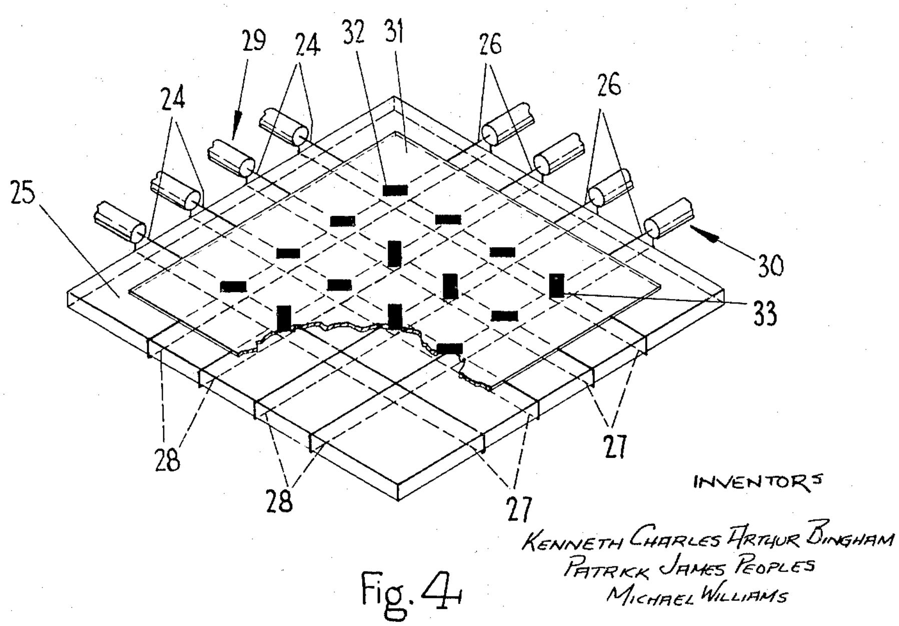
Figures 5, 6:
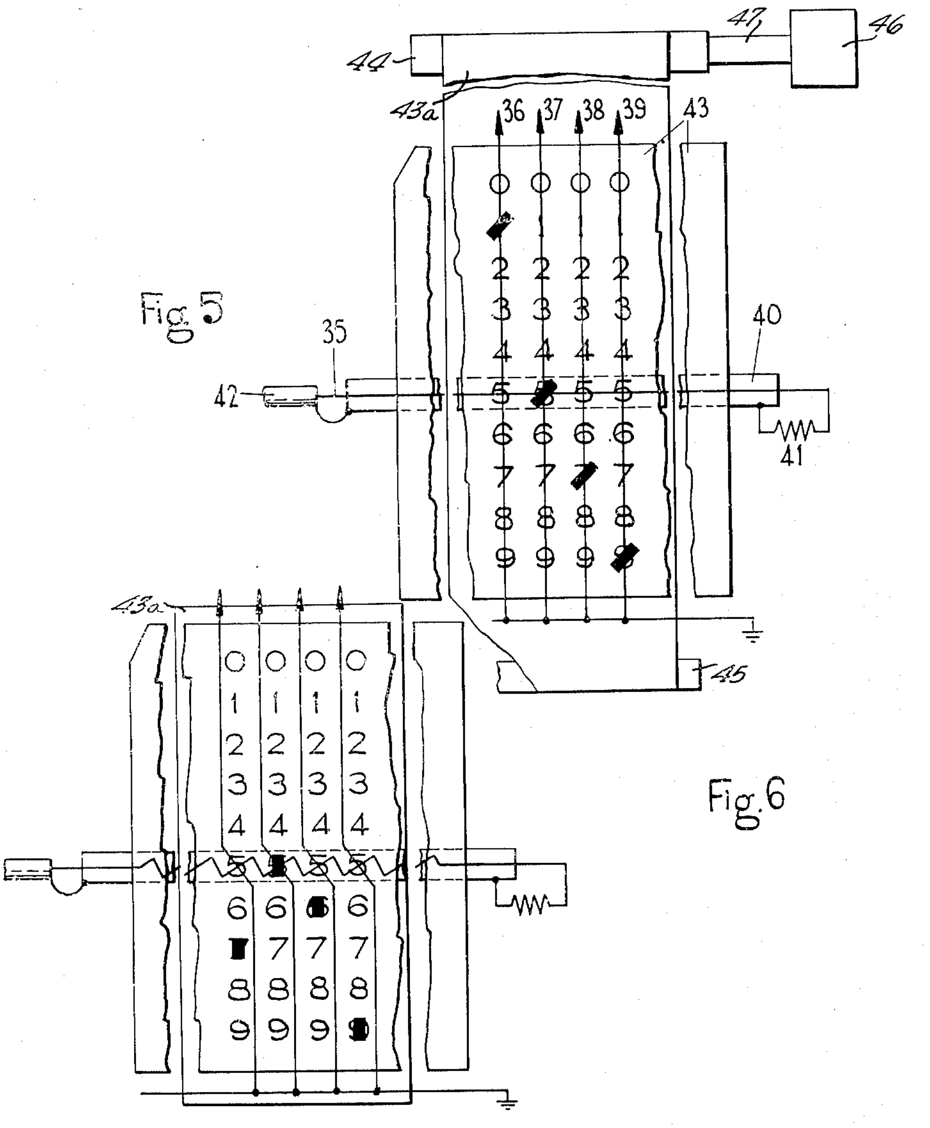

FIGURE 3 indicates diagrammatically a different arrangement of field modifying elements suitable for use in a circuit element according to the invention;

FIGURE 4 shows a simplified form of a matrix suitable for use in a computer to provide a semi-permanent store for numerical data or instructions; and FIGURES 5 and 6 show diagrammatically the principle of operation of embodiments of the invention for reading information presented on cards or tape.

Figure 1:
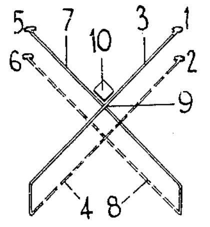
FIGURE 1 is a diagram of a circuit element according to the invention.
Figure 2:
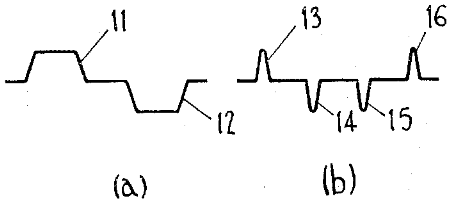
FIGURE 2 shows current and voltage waveforms illustrating the operation of the element according to the invention.

Referring first to FIGURE 1, a pair of terminals 1 and 2 have connected between them in series a drive conductor 3 and a further conductor 4 which provides a return path for the drive conductor. The terminals 1 and 2 provide the input means for the device. A further pair of terminals 5 and 6 have connected between them in series a pick-up conductor 7 and a return conductor 8, the terminals 5 and 6 providing the output means for the device. The conductors 3 and 7 cross at right angles in close juxtaposition at the point 9, and in one sector of the cross so formed there is arranged a small square sheet of conducting, non-ferromagnetic, material 10 such as copper, constituting the modifying element. Referring now to FIGURE 2, FIGURE 2(*a*) shows the signal applied to the input terminals 1 and 2; this signal consists of a pulse 11 having steeply sloping sides, followed by a further pulse 12 of similar form but opposite polarity. FIGURE 2(*b*) shows the voltage appearing across the output terminals 5 and 6 when the input current is of the form shown in FIGURE 2(*a*). This output voltage consists of a pulse 13 corresponding to the rise time of the pulse 11, and a pulse 14 of opposite polarity corresponding to the decay time of the pulse 11, and further pulses 15 and 16 corresponding respectively to the rise and decay of the pulse 12, these pulses being of opposite polarities to the pulses 13 and 14, respectively. In use of the arrangement it will usually be convenient to make use of only one pulse such as 13 or 15, as the case may be, and to shut off the unwanted pulses 14 or 16 by means of gating circuits. Alternatively a diode may be incorporated in the circuit to shut off the unwanted pulses.

FIGURE 3 shows an alternative form of modifying element consisting of two triangular conducting sheets 19 and 20 arranged in diagonally opposite sectors.

FIGURE 4 shows a sixteen-element data storage device according to the present invention. The device consists of four drive conductors 24 parallel to each other lying across the face of an insulating plate 25. Four pick-up conductors 26 cross the drive conductors 24 at right angles. Each drive conductor 24 is provided with a return conductor 27, and each pick-up conductor is also provided with a return conductor 28. The drive conductors 24 are each connected to the central conductor of a different coaxial line 29, the outer conductor of which line is connected to the corresponding return conductor 27. Similarly, the pick-up conductors are each connected to the central conductor of a different coaxial line 30, the outer conductor of which line is connected to the corresponding return conductor 28.

Over the surface of the plate 25 there is laid an insulating sheet 31 on which are mounted discrete conducting strips 32 and 33 each overlying one crossing-point of the conductors 24 and 26. The strips 33 cross the crossing point in an oblique direction from upper left to lower right, and the strips 32 cross the crossing points in an oblique direction from upper right to lower left, as shown in the figure. The widths of the strips are exaggerated in the figure for clarity.

On the application of a drive pulse to one of the conductors 24, through its coaxial lead 29, pulses are produced in the pick-up conductors 26 and conveyed along the coaxial lines 30 to provide the necessary information from the store. In use of the device it can be arranged that only the pulses produced during the rise time of the pulse applied to the conductors 24 are utilised, and the polarity of these depends on whether the corresponding crossing point is occupied by an oblique strip in the sense of 32 or in the sense of 33. The device as so described thus gives an ambipolar output.

If it is desired that the information should consist only of the presence or the absence of a pulse, it is only necessary to use strips of one obliquity such as 32 for those positions in which it is required to generate a pulse, and to omit them for those positions where no pulse is required.

FIGURE 5 shows in diagrammatic form the application of the invention to a device for reading information from cards or tape. A drive conductor 35 crosses a channel through which the card is arranged to be fed by card moving means. Pick-up conductors 36, 37, 38 and 39 cross the drive conductor 35 at points corresponding to the position in the card or tape from which data are to be read. The drive conductor 35 is connected to a return conductor 40 at one end through a small resistor 41 and the input impulse is applied to the conductor 35 at the other end through a coaxial line 42, the outer conductor of the line 42 being connected to the return strip 40. The pick-up conductors 36, 37, 38 and 39 are all earthed at one end and at the other are connected to the inputs of gating and amplifying circuits to receive any output signal. As shown in the diagram, a card 43 having an insulating surface is fed through the space between the drive conductors with its pick-up conductors 36, 37, 38, 39 and the return strip 40. The card is shown in the position indicating a numerical value of 5, at which instant a drive impulse is applied to the drive conductor 35. This impulses provides no output on the output conductors 36, 38 and 39 where the insulated portion of the surface of the card is exposed, but in the position under the pick-up conductor 37 where a conducting strip has been formed or mounted on the card, the conducting strip acts as a modifying element, and an impulse is produced on the pick-up conductor 37.

Alternative methods of arranging the drive and pick-up conductors may be employed. Thus FIGURE 6 shows the drive and pick-up conductors arranged in such a manner that their crossings remain approximately at right angles but are caused to deviate by 45° on entering and leaving the reading zone. In this arrangement the drive and pick-up conductors will be approximately parallel over a portion of their length so that a small signal will be produced in the pick-up conductors when a pulse is applied to the drive conductor. If objectionable, this signal may be neutralised by varying the angle of the crossings of the conductors somewhat out of a right angle, or by eliminating the unwanted signals by a suitable discriminating circuit. In an alternative method of operation, a continuous current in the drive conductor may be employed. In this method the movement of the card bearing the modifying element through the field due to the drive conductor will cause a deformation of the field around it and thereby induce a voltage in the pick-up conductor.

The arrangements so far described have included circuit elements consisting of two crossed conductors lying generally in the same plane, but it will be appreciated that in some cases an element may include a third conductor crossing the other two at the same cross-over point, for example to provide one pick-up conductor and two drive conductors. One or more discrete electromagnetic field modifying elements can then be included in any of the twelve sectors between the three conductors at the cross-over point as may be required for any particular case.

The three conductors are preferably arranged mutually at right angles, but in some cases may cross obliquely.

We claim:

1. A signal translating device comprising a drive conductor, a plurality of pick-up conductors crossing the drive conductors at the spaced points so as to provide a plurality of conductor crossing-points, input means through which an electric current can be supplied to the drive conductor, a support means arranged to move past said crossing-points, and electrically insulating sheet information storage member mounted on said support means and carrying information in the form of discrete electrically conducting, non-ferromagnetic, electromagnetic field modifying elements constituting metal strips mounted on said electrically insulating sheet information storage member, each said field modifying element being positioned to co-operate at some time during the movement of the support means with a said crossing-point so as to then enable a signal to be induced in the corresponding pick-up conductor, and actuating means linked with the support means for causing it to carry the information storage member past the conductor crossing-points.

2. A signal translating device comprising a drive conductor, a plurality of pick-up conductors crossing the drive conductors at spaced points so as to provide a plurality of conductor crossing-points, input means through which an electric current can be supplied to the drive conductor, and support means arranged to move past said crossing-points an electrically insulating sheet information storage member comprising information in the form of electrically conducting, non-ferromagnetic, electromagnetic field modifying elements constituting electrically conductive marks on the electrically insulating sheet information storage member, each said field modifying element being positioned to co-operate at some time with a said crossing-point so as then to enable a signal to be induced in the corresponding pick-up conductor.

3. A signal translating device including a plurality of drive conductors, a plurality of input conductors crossing the drive conductors so as to provide an array of conductor crossing-points, a plurality of input means through which electric currents can be respectively supplied to the drive conductors, and support means carrying and presenting to the array of crossing-points an information storage member formed of discrete electrically conducting, non-ferromagnetic, electromagnetic field modifying elements constituting metal strips mounted on said electrically insulating sheet storage member, each said field modifying element being positioned to co-operate with a said crossing-point.

4. A signal translating device including a plurality of conductors crossing the drive conductors so as to provide an array of conductor crossing-points, a plurality of input means through which electric currents can be respectively supplied to the drive conductors, and support means arranged to present to the array of crossing-points, an electrically insulating sheet information storage member comprising information in the form of electrically conducting, non-ferromagnetic, electromagnetic field modifying elements constituting electrically conductive marks on the electrically insulating sheet storage member, each said field modifying element being positioned to co-operate with a said crossing point.

References Cited by the Examiner

UNITED STATES PATENTS

| | | | |
|---|---|---|---|
| 2,825,891 | 3/1958 | Duinker ____________ | 340—174 |
| 2,911,627 | 11/1959 | Kilburn et al. _______ | 340—174 |
| 3,102,999 | 9/1963 | Berneymr ___________ | 340—174 |

IRVING L. SRAGOW, *Primary Examiner.*

JOHN F. BURNS, *Examiner.*